United States Patent [19]
Ritter

[11] Patent Number: 5,000,770
[45] Date of Patent: Mar. 19, 1991

[54] SHAFT HAVING A MOVING BED OF POURABLE MATERIAL

[75] Inventor: Juergen Ritter, Braunschweig, Fed. Rep. of Germany

[73] Assignee: Nymic Anstalt, Schaan, Liechtenstein

[21] Appl. No.: 424,254

[22] PCT Filed: Feb. 17, 1989

[86] PCT No.: PCT/EP89/00149
§ 371 Date: Dec. 18, 1989
§ 102(e) Date: Dec. 18, 1989

[87] PCT Pub. No.: WO87/00767
PCT Pub. Date: Feb. 12, 1987

[30] Foreign Application Priority Data
Feb. 19, 1988 [DE] Fed. Rep. of Germany ....... 3805198

[51] Int. Cl.⁵ ............................................. B01D 46/32
[52] U.S. Cl. .......................................... 55/474; 55/479
[58] Field of Search ........................... 55/99, 474, 479; 34/167, 174

[56] References Cited

U.S. PATENT DOCUMENTS

| | | | |
|---|---|---|---|
| 620,925 | 3/1899 | Hirt | 55/474 |
| 1,782,823 | 11/1930 | Hechenbleiker | 55/474 |
| 3,090,180 | 5/1963 | Berz et al. | 55/350 |
| 4,451,272 | 5/1984 | Mathewes et al. | 55/390 |
| 4,726,821 | 2/1988 | Sgaslik | 55/196 |

*Primary Examiner*—Bernard Nozick
*Attorney, Agent, or Firm*—Foley & Lardner, Schwartz, Jeffery, Schwaab, Mack, Blumenthal & Evans

[57] ABSTRACT

Device for the separation of components, preferably heavy metals, sulfur dioxide, contained in gas and for dust removal in gaseous media charged with solids, especially in cold and hot preparation gases and combustion gases by means of a pourable granular pellet material as filter medium, or for the treatement, preferably drying or for the thermochemical treatment of a pourable granular treatment material by means of a gaseous treatment medium, whereby the pourable material moves from the top to the bottom between a feeding means and a discharge means through a shaft of preferably rectangular cross-section, as moving bed, substantially filling the cross-section thereof, while the gaseous medium is conducted in counterflow thereto between a raw gas inlet and a pure gas outlet.

7 Claims, 6 Drawing Sheets

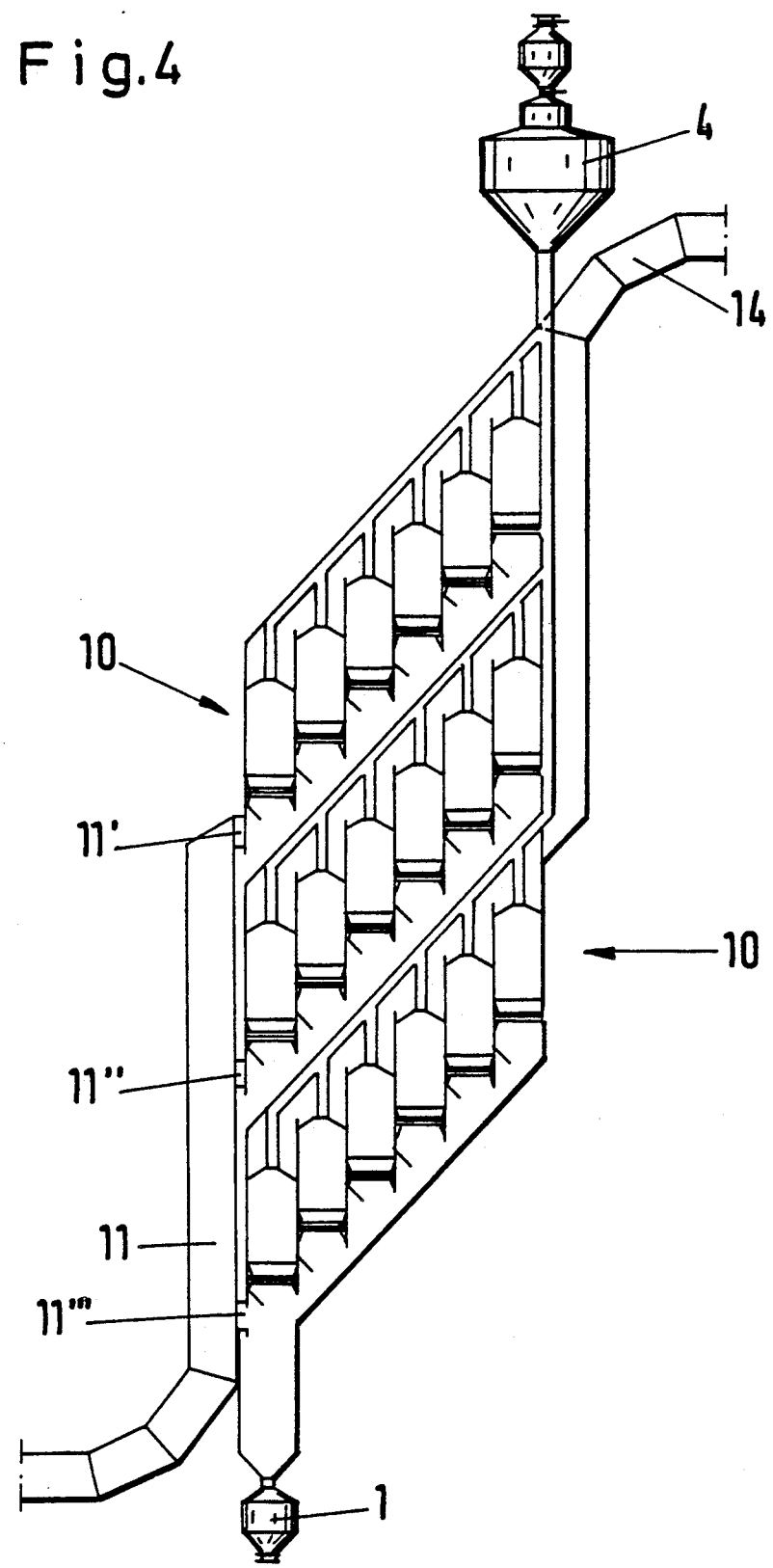

SHAFT HAVING A MOVING BED OF POURABLE MATERIAL

The invention relates to a shaft having a moving bed of pourable bulk material which substantially fills the cross-section of the shaft and moves through it from the top to the bottom between a feeding means and a discharge means, whereby there are arranged in the lower region of the moving bed a plurality of fixed roof-shaped pellet guide sections next to one another, in each case leaving a material outlet slit free, and whereby there are arranged below the latter, and associated with the latter, discharge members which are at least approximately horizontal and can be moved back and forth by means of a drive device, and by means of which the amount f material throughput can be metered between 0 and a given maximum by varying the travel and/or the frequency of the reciprocating motion.

In devices of this type, on the one hand it is important that there are no paths of different length of the individual grains of the pourable material during the discharge process in the moving bed, so that virtually only a vertical flow direction but no transverse motion of the grains is possible, and on the other hand that no preferred passage zones with hollow spaces occur at the underside of the column of material, as a result of which different chargings of the particles whirled up in the hollow spaces and of the adjacent material zones could occur.

A further requirement with devices of the present type is as finely graded as possible a variation of the material throughput through the shaft and the consequent adaptability to changing operating conditions both with respect to the pourable material and with respect to the gaseous medium. In this respect, all the known devices mentioned are unsatisfactory, because they only permit a relatively coarsely graded variation of the depot pockets located next to one another in the grid plate, whose volumes cannot be reduced arbitrarily both for constructional reasons and owing to the danger of blockage.

They also require a high outlay for the drive device for providing the reciprocating motion because the relatively high frictional forces between the fixed baffle plates and the moved grid plate as well as the inertia forces of the naturally heavy grid plate must be overcome. Moreover, particles of material can be jammed in between the moving parts, which can lead to uncontrollable increases in resistance. In addition, in the case of sensitive materials, the particles of material may disintegrate or be damaged, which can impair the reaction capability of the material with the gaseous

SUMMARY OF THE INVENTION

The object of the invention is to design a shaft of the type mentioned at the beginning in such a way that a finely graded or infinite variability of the discharged material and the use of simple means with a low outlay for the control for generating the reciprocal motion are possible.

The invention employs the angle of repose metering principle, with which a finely graded or infinite variation of the travel and/or frequency of the drive can be implemented for the reciprocating motion with simple means. A particularly even transport of the pourable material through the shaft is achieved in that a cone formation in the material is counteracted by the slit apertures in at least one upper plate-like tier so that the material from the center of the material outlet slit formed by the pellet guide sections is also transported away. The metering occurs solely by the material trickling down from the bottom layer and not by stripping off, so that there is only a comparatively slight friction to be overcome by the drive and there is no risk of damage to the pourable material resulting from shearing forces occurring between the stripper and bottom layer.

In the case of a very fluid material, problems can arise when filling the material into the shaft. As a result of the drop height of the material and as a result of its good fluidity, it may happen that the material does not come to rest on the lower continuous plate, but trickles permanently. In this case, it is expedient to design the lower plate to be capable of folding upward, symmetrical to the slit aperture below the slit apertures of the plates lying above it, so that the lower plate in each case assumes the form of a V. The angle with the horizontal may be in this case, for example, 45° for both legs. Once the shaft has been filled, the lower plate can be made flat again. Since the material now lies unaccelerated on the lower plate, trickling no longer occurs. Together with the lower plates, preferably the plate(s) lying above them, which may be mechanically connected to the lower plates, is (are) adjusted in the same manner.

In a particularly preferred application, the shaft according to the invention is used for the separation of components, preferably heavy metals and sulfur dioxide, contained in gas, and for dust removal in gaseous media charged with solids, especially in cold and hot preparation gases and combustion gases by means of a pourable granular pellet material as filter medium, or for the treatment, preferably drying or thermochemical treatment of the pourable granular treatment material by means of a gaseous treatment medium, the gaseous medium being circulated through in counterflow to the moving bed between the feeding means thereof and its discharge means. According to the invention, the plate-like tiers and the pellet guide sections are also impermeable to the gaseous medium.

A shaft for said preferred application is known from German Offenlegungsschrift 3,406,413. In this, the roof-shaped guide sections are impermeable to the pourable material, but permeable to the gaseous medium. The discharge members are composed of a common plate which is designed in the manner of a light grid, can move back and forth, contains depots for partial quantities of the pourable material and is carried by relatively narrow dust plates which are located in each case below the material opening slits, the material trickling over the edges thereof out of the depots during the reciprocating movement. Since the guide sections must permit the passage of the gaseous medium, but are impermeable to the pourable material, they must be provided with extremely fine bores or narrow slits, which naturally leads to considerable flow resistances, particularly since there is a risk of clogging from impurities. The outlay for the drive of the conveying means for the gaseous medium is thus relatively high with these systems.

Similar is true of the devices according to German Offenlegungsschrift 3,611,953, the design of which in principle corresponds to the device from German Offenlegungsschrift 3,406,413, and differs only with respect to the design of the discharge members. Namely, the grid plate is there designed to be fixed, while above and below the latter in each case a sieve plate can be moved back and forth. Accordingly, the flow resistance is particularly greatly evident here. The drive outlay is also greater, because two separate drives are necessary for the drive and control members for achieving the reciprocating motion, one for the upper and one for the lower sieve plate, which in addition also need to work in opposition. Moreover, there is a risk of damage to the pourable material from the parts of the escape means moved in opposition to one another.

With its special design of the discharge members as an "upside-down pine tree", the arrangement according to the invention permits the admittance of the gaseous medium not only to the outer regions of the column of material present in each case between the guide sections, but also to the central region thereof, so that the guide sections can thus be formed readily from material impermeable to gas, as a result of which not only is the production outlay reduced, but also the risk of blockage is avoided.

It has, it is true, already been proposed in German Offenlegungsschrift 3,213,664 to arrange in a device for cleaning dust gases plates arranged above one another in several tiers which can be moved back and forth and in which the pourable material trickles out as a result of the angle of repose for the respective plate varied by the reciprocating motion. However, this is a different type of dust removal device, because said tiers are interspersed through the entire shaft from the top to the bottom and the gas is introduced into a center of the shaft which is not filled with pellet material and passes through the filter medium in a transverse flow. The entire shaft is thus not filled with a pourable material substantially filling its cross-section. In systems of this kind, the overall height of the shaft is increased to achieve the desired filter effect.

According to an embodiment of the subject-matter of the invention, it is envisaged that all discharge members, forming a uniform frame, are connected to one another, the frame being mounted on spring elements and being connected to the drive means for the reciprocating motion. This employs a favorable arrangement, as regards the bearing and vibration techniques, known from so called shaking troughs. In a preferred embodiment, the plate-like tiers are designed as a prefabricated module together with the drive mechanism effecting the reciprocal motion. Accordingly, the device parts responsible for the even discharge intended for the invention can be prefabricated as a module and its functioning tested. The parts which are sensitive for the functioning of the system can be placed into a shaft produced on site, preferably pushed into it, the drive remaining outside the shaft. The remaining parts of the shaft are not critical for the functioning of the discharge. In some application cases, it may be advantageous to use the device according to the invention in dual or multiple shaft systems in which two or more complete dust removal or treatment shafts, which are preferably mutually offset in terms of height cascade-fashion, are accommodated in a shaft system enclosing them, in such a way that the part shafts are in each case connected to a common feed means and a common discharge means.

With an arrangement of this type, it is possible to manage comparatively high outputs with respect to the throughput of material and gas and nevertheless keep the external dimensions of the system within reasonable limits.

The introduction of the pellet material into the shaft and its discharge from the shaft are automatically coupled (cf. FIGS. 3 and 4) and are therefore so uniform that a separate throughput control device for the upper region of the moving bed can be dispensed with. The control of the plane-parallel throughput of the moving bed through the shaft is effected solely by the discharge means functioning as a metering system, with which it is possible to remove the pellet material out of the shaft uniformly and with a uniform volume.

Furthermore, the device can be used for the separation of components, such as preferably heavy metals and sulfur dioxide, contained in gaseous media, such as, for example, by the use of activated charcoal or hearth furnace coke as adsorbents. In this case, as a result of the counterflow, not only is the best material transition achieved in comparison to other gas flows such as cross flow (transverse flow) or cross counterflow in an absorber designed as a shaft, but also all components contained in the gas which would impair the adsorption process—such as dust or ammonium salt formations from preceding process stages—are immediately separated at the boundary layer of the pellet material at the gas inlet faces, and are discharged from there by means of a vibration device.

This has the advantage that the pressure loss in individual zones of the column of pellet material does not rise uncontrolled in the reaction chamber as a result of vagabond dusts and the gas is not forced to circulate preferably through the dust-free zones. By keeping the column of pellet material free of dust, uniform flow conditions prevail to a large extent in the reaction chamber. The discharge of the uppermost layer of the pellet material soiled by dusts at the gas inlet faces can be controlled by pressure loss measurements in such a way that the discharge is effected by vibration of the discharge means already when the pressure loss rises slightly. As a result of this measure, the pressure loss in the reactor can be continuously reduced to a minimum. Thus, this device prevents undesired solids penetrating into the reaction chamber, so that also no caking or lumping of the pellet material can take place in the reaction chamber, which would make its discharge from the reactor more difficult. The combined discharge and circulating means is designed in such a way that the gaseous medium can circulate through the moving bed in all regions in all operating states, that is to say there are no areas which are difficult to circulate through or even dead areas, so that no "hot spots" can arise when using, for example, activated charcoal or hearth furnace coke. The same is true analogously for the use of activated charcoal or hearth furnace coke in a reactor equipped with the discharge means according to claim 1 for the nitrogen removal in exhaust gases, whereby here it is not the adsorption capacity of the carbon product which is important, but above all its catalytic effect with the use of ammonia.

The device is particularly suitable as a filter for the separation of adhesive and viscid dusts from gaseous media since these dusts are separated directly on the gas inlet faces, that is on the respective surface of the granular filter medium, resting on the discharge plates—with the respective state either the rest position of the discharge member or its angle of repose in accordance with its discharge movement. Here, too, a regulation of the discharge of the filter medium charged with dust is easy to control via pressure loss measurements.

In the device functioning according to the counterflow principle, the flow speeds can be freely selected up to the point of loosening of the pellet-like filter medium.

The selection of the flow speed is carried out as a rule with regard to the economic balancing between minimization of the filter area and the permissible pressure loss, provided that technical reasons do not prescribe a particular flow speed or a particular pressure loss.

By arranging the input of the filter medium in the shaft (cf. FIG. 3), it is ensured that as much pourable filter medium automatically flows back into the filter chamber as filter medium charged with dust is discharged at the bottom end of the shaft through the discharge means as a result of vibrating movement of the discharge faces. This ensures that the filter bed has the same height—or filter bed depth—in every operating state.

The arrangement of the input of the pourable filter medium into the filter chamber, however, also permits the filter bed height to be optimized, that is kept as small as is necessary for the filtering process. At the same time, this provides the possibility of minimizing the pressure loss.

An essential advantage of the invention is also to be considered in the fact that there is a high degree of freedom in the selection of the filter medium and the selection of material for forming the device. By using highly resistant materials—with regard to temperature and corrosive attacks for the design of the device and as filter medium it is also possible for dust to be removed from hot gases up into the temperature range of 900° C. to 1,000° C., or aggressive and other materials to be separated from gaseous media, which can then either be disposed of or used again in a recycling process or be further processed as valuable substances. It is possible with the device to solve problems for which there have hitherto been no technically and economically satisfactory answers with other filter systems

BRIEF DESCRIPTION OF THE DRAWINGS

The object of the invention is described below with reference to diagrammatic sketches by way of example, in which:

FIG. 4 shows a vertical section through a multiple shaft system.

DETAILED DESCRIPTION OF THE PREFERRED EMBODIMENTS

Figure 1A:
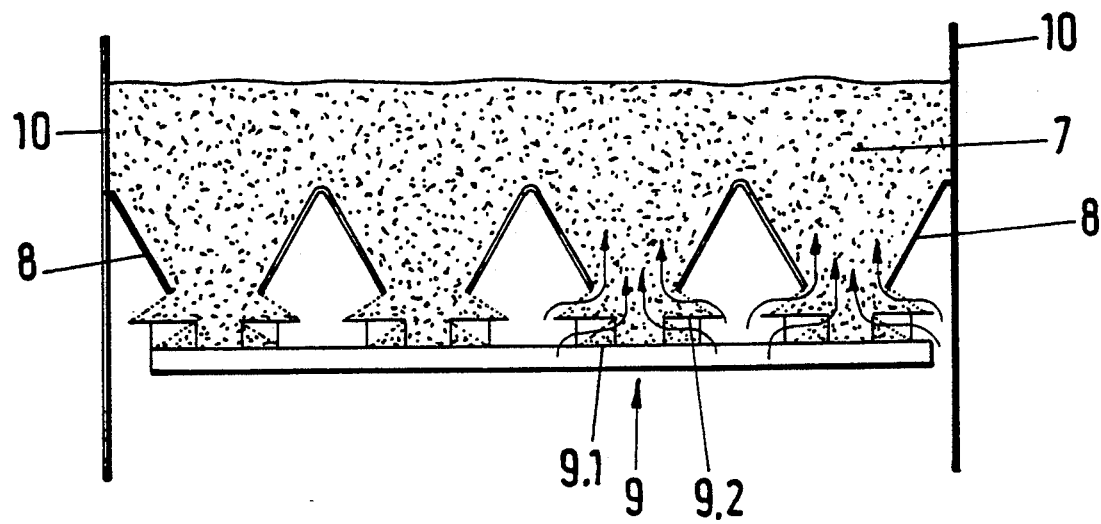
FIG. 1a shows a vertical part section through a shaft filled with a moving bed of material with two-tier discharge members in the stationary state.
Figure 1B:
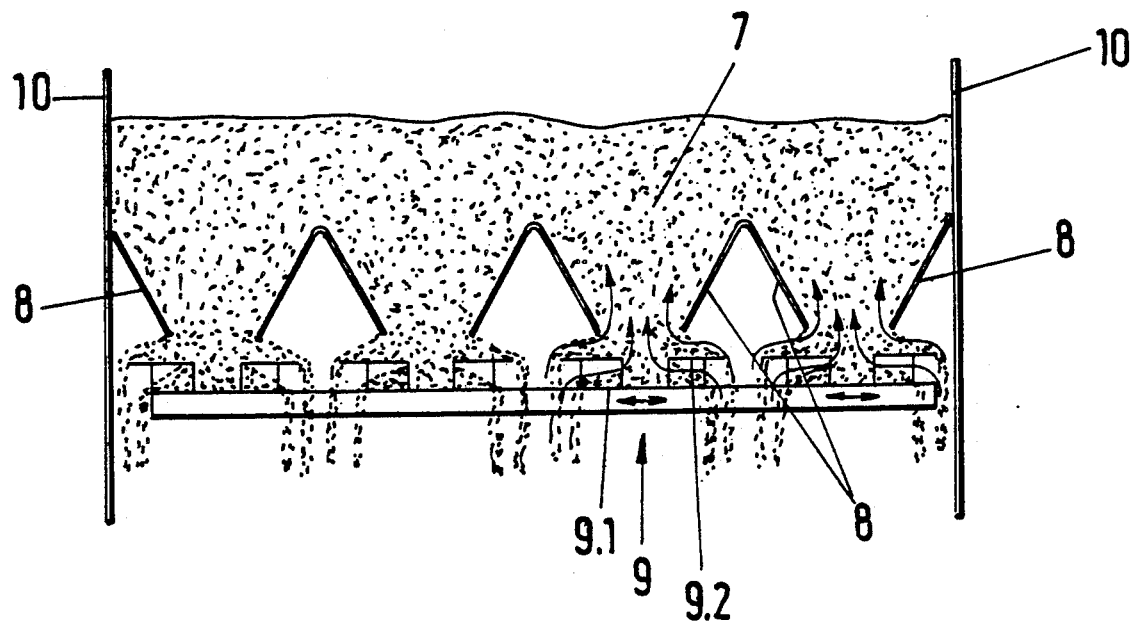
FIG. 1b shows the same part section as in FIG. 1a, however with the discharge members in the moving state.
Figure 1C:
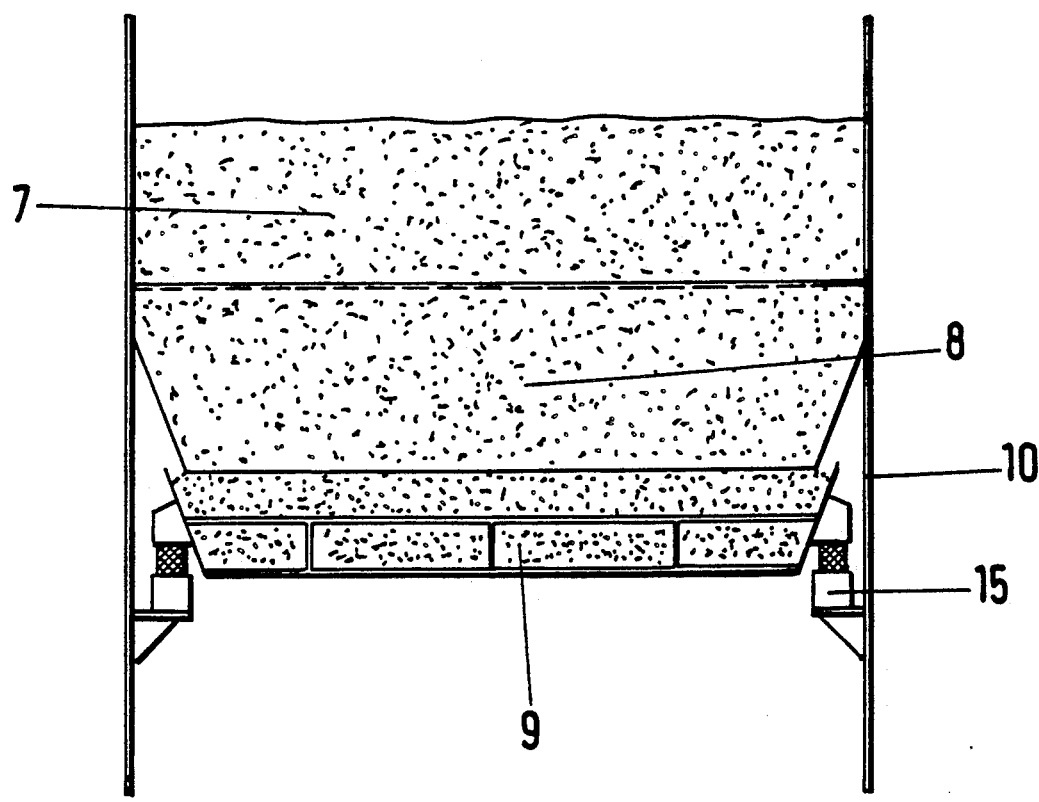
FIG. 1c shows a part section corresponding to FIGS. 1a and b, however transversely thereto.

In FIGS. 1a to c, in each case only that part of the shaft and of the moving bed of material is shown in which the material discharge members are located; the remaining parts of the device have been omitted in these drawings. Reference 10 denotes the walls of a shaft of essentially rectangular cross-section, the cross-section of which is filled by a pourable granular material which moves through the shaft from the top to the bottom and is accordingly designated by moving bed of material 7. Located at the bottom edge of this moving bed are a plurality of guide sections 8 for the material, which are in each case of roof-shaped design and are arranged next to one another in the horizontal direction. They run in pairs parallel to one another and extend from one shaft wall to the opposite one and are connected at their end points rigidly to the shaft walls There is in each case left free between two guide sections 8 an opening slit, the width of which is dimensioned according to the number of opening slits and the maximum required throughput of material through the shaft.

Figure 1D:
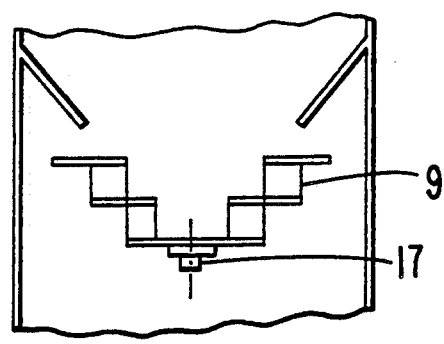
FIGS. 1(d) and 1(e) show a top view and vertical cross section of the plate-like tiers of the discharge members which are interconnected to each other and driven by the illustrated drive means.
Figure 1E:
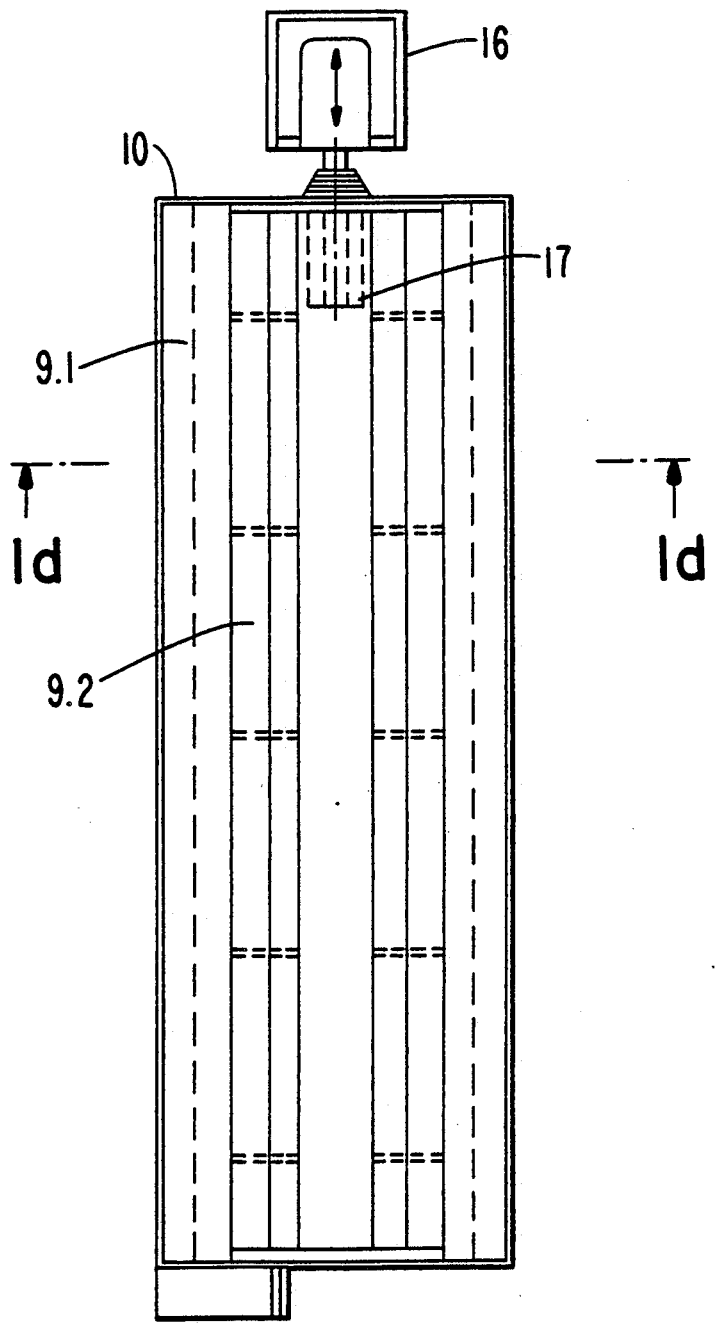

In close proximity below each opening slit, there are arranged above one another in tier-fashion in the embodiments according to FIGS. 1a to c two plates 9.1, 9.2 made of material impermeable to the material and to the gaseous medium, the lower plate 9.1 being designed to be continuous, that is without slit aperture, and the upper plate 9.2 being designed to be wider than the lower plate and having a central slit opening which runs parallel to the longitudinal extent of the upper plate. As generally shown in FIGS. 1(d) and 1(e), these plate tiers represent inherently rigid structures which are connected rigidly with a common rod, generally shown as 17 turn interacts with a drive means generally shown as reference 16.

The vertical distance between the opening slit and the tiers on the one hand, and the width of the slit aperture on the other hand is dimensioned such that when the reciprocating motion is at a standstill, the slope of material formed when material emerges from the material outlet slits is not sufficient to allow the material to trickle over the inner and outer edges of the plates. In this operating state, therefore, all throughput of material through the shaft is interrupted. When the reciprocating motion commences, the angle of repose or angle of slope decreases, so that now the material trickles over the inner and outer edges of the plates, to be precise depending on the frequency and the travel of the reciprocating motion. By varying these parameters, it is thus possible to control the throughput of material from 0 to a given maximum.

This control can readily be made finely graded or even infinite in the subject-matter of the invention, because for this purpose it is only necessary to control the drive for the reciprocating motion accordingly, which can be achieved with simple means and it is thus not necessary to represent it or describe it in detail.

Omitting various details, FIG. 1c shows the mounting of the frame 9 bearing the individual tier-like discharge members on the container walls 10. These are resilient vibrating elements 15, conventionally known per se in conveying technology, which are preferably manufactured from rubber-elastic plastic and simultaneously perform a bearing function and a function promoting the reciprocating motion.

Figure 2:
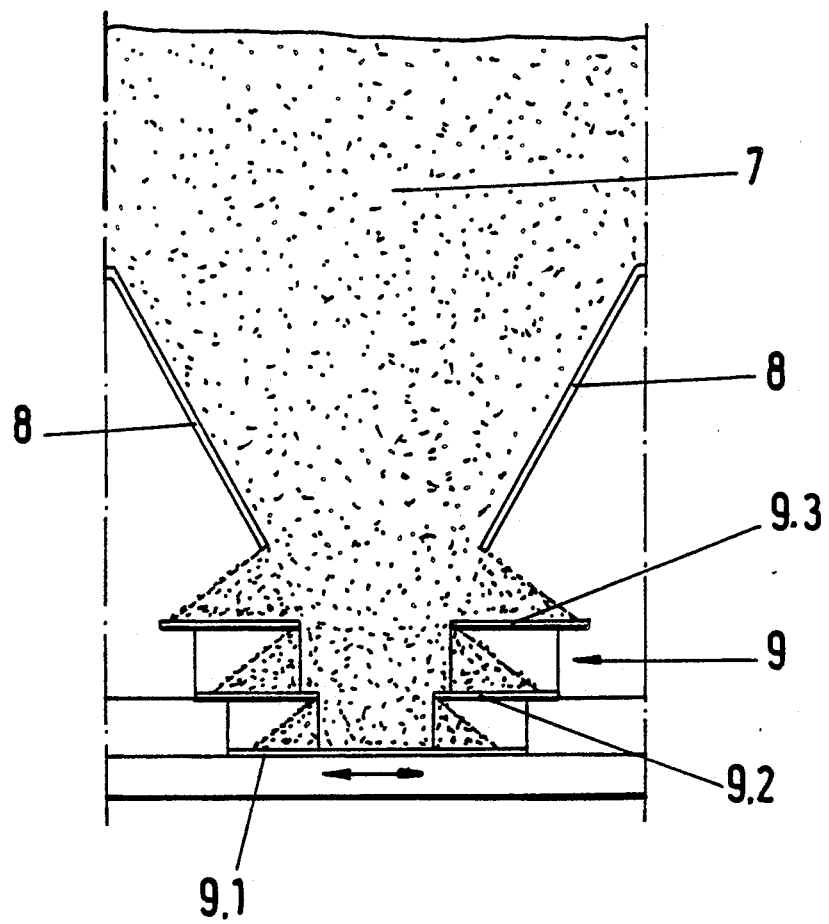
FIG. 2 shows a single three-tier discharge member on an enlarged scale.

In the embodiment according to FIG. 2, there is a three-tier plate structure 9.1, 9.2, 9.3 in which the plates of the second tier 9.2 and of the third tier 9.3 in each case have a central slit aperture, the slit aperture of the third tier being broader than that of the second one, so that there is a type of "upside-down pine tree" as it were.

The number of tiers could also be increased to more than three, whereby the consequent enlargement of the overall height must be taken into account for the respective application case.

The essential factor is only that, as a result of the abovementioned dimensioning of the plates and their slit apertures, as well as a result of the tier-like arrangement, the column of material emerging from the material outlet slits narrows in the core towards the bottom and is fanned out laterally in order to provide the gaseous medium in all operating conditions, that is also when the reciprocating motion is at a standstill, with an optimum admittance to all the regions, that is also to the core, of the column of material.

Figure 3:
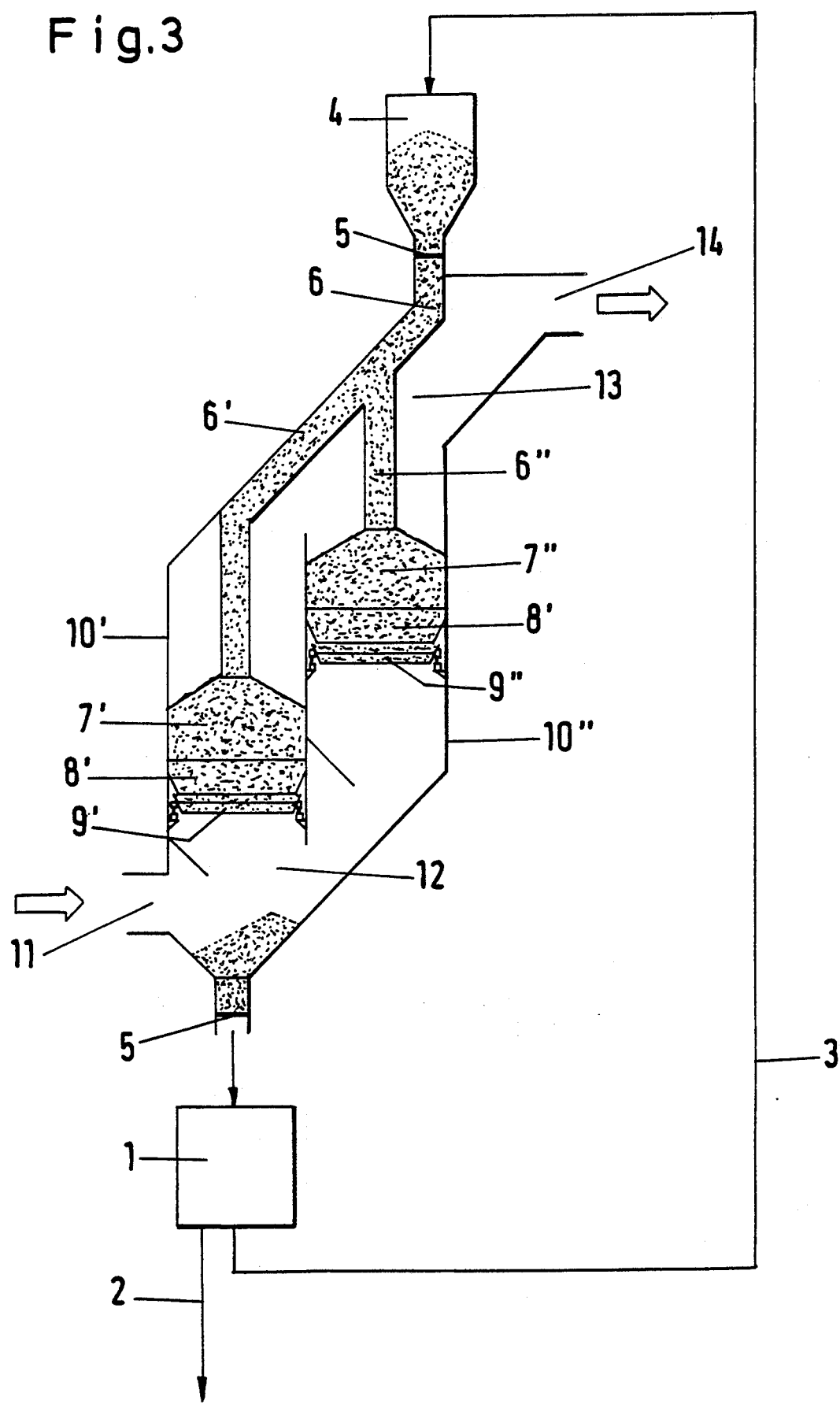
FIG. 3 shows a vertical section through a two-shaft system.

FIG. 3 shows an application form of the device according to the invention in a system with two dust removal shafts are arranged cascade-fashion, the complete system being shown here. The material flows out of a common silo 4 for cleaned material via a slide valve 5 into a channel 6 and, after branching into the supply channels 6', 6", into the shafts 10', 10", in which it forms in each case a moving bed 7', 7" which is equipped with the guide sections 8', 8" and discharge means 9', 9" described in FIGS. 1a to c and 2. Below these devices, the two shafts 10', 10" are combined to form a common collecting funnel for the material which merges, via a slide valve 5, into a cleaning device 1 for charged material, in which dust is removed from the material and the material is fed back via a return line 3 into the silo 4 for cleaned material, while the dust from the cleaning device 1 is carried away via a dust discharge 2. Said collecting funnel 12 serves simultaneously as flow approach chamber for the gaseous raw medium which the latter reaches through a raw gas inlet 11. From the flow approach chamber 12, in each case half of the raw gas enters into the two shafts 10', 10" and circulates in counterflow through the material bed 7', 7", to emerge above the latter in a common funnel-shaped narrowed pure gas collection chamber 13, from which it is carried away through the pure gas outlet 14.

In the system illustrated in FIG. 4, three—but it is also possible to have four or more—multiple shaft systems of the type discussed above with respect to FIG. 3 are combined to form a large system, also known as an adsorber system, the multiple shaft systems being arranged above one another in a large shaft system, and the material feeds of each multiple shaft system being fed from a common silo 4 for uncharged pellet material The walls of the material supply channels of the middle and lowermost multiple shaft system act here as collecting funnels for the uppermost and middle multiple shaft system, while the walls of the large shaft act as collecting funnel for the lowermost multiple shaft system. All collecting funnels merge into a common collecting silo 1 for the charged pellet material.

Gas is supplied to the individual collecting funnels via in each case one raw gas inlet 11', 11" which branches off from a common raw gas line 11. The pure gas is combined analogously in a common pure gas line 14 and carried away.

I claim:

1. A shaft comprising:
   at least two walls, the cross-section of said walls being filled with a moving bed of pourable bulk material which moves through the shaft from the top to the bottom;
   material feeding means positioned above said moving bed and material discharge means positioned below said moving bed;
   a gas inlet and a gas outlet, the gas inlet being positioned below the moving bed and the gas outlet being positioned above the moving bed such that a gas flows through the full height of the moving bed;
   a plurality of fixed roof-shaped guide sections being located at a lower region of said moving bed, said roof-shaped guide sections forming an outlet slit between each pair of guide sections;
   said outlet slit having at least two discharge plates positioned below the slit and arranged in tiers with the lowermost plate extending over the entire width of the outlet slit, said discharge plates being connected rigidly to each other via a common rod, the common rod being connected to a drive for instituting a vibrating motion to the discharge plates; and
   wherein the discharge plates located above the lowermost discharge plates each have a slit aperture above the lower plate such that when the discharge plates are at standstill, the material remains on the respective plate lying therebelow, in accordance with an angle of repose associated with the standstill state, and when the discharge plates are vibrating, the material trickles out beyond the edges of the plates, in accordance with an angle of repose associated with the vibrating state.

2. A shaft as claimed in claim 1, wherein a gaseous medium is circulated in counterflow through said moving bed, for the separation of components contained in the gas or for the treatment of the pourable bulk material with said gaseous medium, wherein said discharge plates and said guide sections are impermeable to the gaseous medium.

3. A shaft as claimed in claim 1, wherein the discharge plates are interconnected to form a uniform frame, said frame being mounted on a set of spring elements and being connected to the drive for instituting the vibrating motion to the discharge plates.

4. A shaft as claimed in claim 1, wherein the discharge plates are designed together with the drive for the vibrating motion as a module, which can be push-fit into the shaft.

5. A shaft as claimed in claim 1, wherein two or more complete shafts, are mutually off-set in cascade fashion, are accommodated in a shaft enclosing them such that the part shafts are in each case connected to a common feed means and a common discharge means.

6. A shaft as claimed in claim 5, wherein two or more shaft systems are arranged in an enclosing shaft system, the systems being connected on the material feed side to a common feed means and on the material discharge side to a common discharge means.

7. A shaft as claimed in claim 1, wherein the slit apertures of the upper discharge plates are arranged centrally under the outlet slits and transversely to the direction of the vibrating motion.

* * * * *